(12) United States Patent
Van Den Bergen et al.

(10) Patent No.: US 10,189,930 B2
(45) Date of Patent: Jan. 29, 2019

(54) POLYMERIC PHOTOINITIATORS

(71) Applicant: Allnex Belgium S.A., Drogenbos (BE)

(72) Inventors: Hugues Van Den Bergen, Drogenbos (BE); Paul Gevaert, Geraardsbergen (BE); Steven Cappelle, Ninove (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 0 days.

(21) Appl. No.: 14/895,950

(22) PCT Filed: Jul. 23, 2013

(86) PCT No.: PCT/EP2013/065558
§ 371 (c)(1),
(2) Date: Dec. 4, 2015

(87) PCT Pub. No.: WO2015/010729
PCT Pub. Date: Jan. 29, 2015

(65) Prior Publication Data
US 2016/0130380 A1    May 12, 2016

(51) Int. Cl.
*C08F 222/22* (2006.01)
*C09D 4/00* (2006.01)
*C08K 5/103* (2006.01)
*C08G 65/332* (2006.01)
*C08F 222/10* (2006.01)

(52) U.S. Cl.
CPC ........ *C08F 222/22* (2013.01); *C08G 65/3326* (2013.01); *C08K 5/103* (2013.01); *C09D 4/00* (2013.01); *C08F 222/1006* (2013.01)

(58) Field of Classification Search
CPC .... C09D 4/00; C08F 222/22; C08F 222/1006; C08K 5/103; C08G 65/3326
See application file for complete search history.

(56) References Cited

U.S. PATENT DOCUMENTS

| | | | |
|---|---|---|---|
| 3,429,852 | A | 2/1969 | Skoultchi |
| 4,022,674 | A | 5/1977 | Rosen |
| 4,134,814 | A | 1/1979 | Poortere et al. |
| 4,677,155 | A | 6/1987 | Finter |
| 4,797,347 | A | 1/1989 | Finter |
| 5,905,164 | A | 5/1999 | Anderson et al. |
| 8,530,510 | B2 | 9/2013 | Loccufier et al. |
| 8,536,217 | B2 | 9/2013 | Loccufier et al. |
| 2005/0037277 | A1 | 2/2005 | Herlihy |
| 2006/0160915 | A1 | 7/2006 | Fuchs et al. |
| 2007/0243342 | A1 | 10/2007 | Shukla et al. |
| 2010/0227076 | A1 | 9/2010 | Yokoi et al. |
| 2011/0063388 | A1 | 3/2011 | Loccufier et al. |
| 2011/0159203 | A1 | 6/2011 | Loccufier et al. |
| 2011/0224324 | A1 | 9/2011 | Loccufier et al. |
| 2011/0282091 | A1 | 11/2011 | Liu et al. |
| 2014/0335326 | A1 | 11/2014 | Gevaert et al. |

FOREIGN PATENT DOCUMENTS

| | | | |
|---|---|---|---|
| CN | 1727320 | 2/2006 | |
| CN | 102101896 | 6/2011 | |
| CN | 102766045 | * 7/2012 | ............ C08F 220/32 |
| CN | 103059168 | 4/2013 | |
| CN | 104080865 | 10/2014 | |
| EP | 2 130 817 | 12/2009 | |
| EP | 2 161 290 | 3/2010 | |
| EP | 2 199 273 | 6/2010 | |
| EP | 2 617 705 | 7/2013 | |
| EP | 2 617 783 | 7/2013 | |
| JP | S51-138730 | 11/1976 | |
| JP | S58-103512 | 6/1983 | |
| JP | H01-319504 | 12/1989 | |

(Continued)

OTHER PUBLICATIONS

Allnex, "Radcure UV/EB Energy Curable Resins," Product Guide, 2014.*
Lin et al., machine English translation of CN 102766045, pub. Jul. 2012.*
International Search Report dated Nov. 26, 2013 in International (PCT) Application No. PCT/EP2013/065558.
Lihua Hu et al., Synthesis and photoinitiating behavior of hyperbranched polymeric photoinitiators bearing coinitiator amine, Polymers Advanced Technologies, vol. 22, 2011, pp. 1673-1680.
Bishwa R. Nayak et al., Multifunctional Photo- for Acrylate and Methacrylate Polymerization, Polymer Preprints (American Chemical Society Division of Polymer Chemistry), vol. 46(1), 2005, pp. 700-701.

(Continued)

*Primary Examiner* — Jessica M Roswell
(74) *Attorney, Agent, or Firm* — Wenderoth, Lind & Ponack, L.L.P.

(57) ABSTRACT

The present invention relates to radiation curable compositions (A) comprising—(a) at least one photoinitiator compound of formula (I) wherein Q is the residue of a hydroxy compound having 1 to 6 hydroxyl groups, and wherein x is a number that is at least 1 but no greater than the number of hydroxyl groups originally present in said hydroxy compound;—(b) at least one ethylenically unsaturated compound selected from monomers (b1) and/or from oligomers (b2); and—(c) optionally, at least one co-synergist which preferably is an amino co-synergist. The present invention further relates to photoinitiator compounds(a) and their preparation.

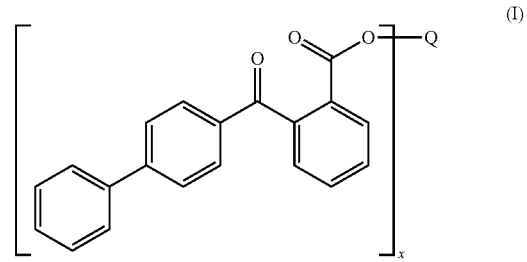

19 Claims, No Drawings

(56) References Cited

FOREIGN PATENT DOCUMENTS

| | | | | |
|---|---|---|---|---|
| JP | H06-263812 | 9/1994 | | |
| JP | H10-153855 | 6/1998 | | |
| JP | H10-161394 | 6/1998 | | |
| JP | 2000-503053 | 3/2000 | | |
| JP | 2004-061584 | 2/2004 | | |
| JP | 2015-509099 | 3/2015 | | |
| JP | 2015-511218 | 4/2015 | | |
| WO | 02/22700 | 3/2002 | | |
| WO | 03/033452 | 4/2003 | | |
| WO | 2009/147057 | 12/2009 | | |
| WO | 2010/029016 | 3/2010 | | |
| WO | 2010/029017 | 3/2010 | | |
| WO | 2010/069758 | 6/2010 | | |
| WO | 2011/117591 | 9/2011 | | |
| WO | WO 2012-136588 | * 10/2012 | ............ | C09D 11/00 |
| WO | WO 2012-136593 | * 11/2012 | ............ | C09D 11/00 |
| WO | 2013/107588 | 7/2013 | | |

OTHER PUBLICATIONS

Carlo Carlini et al., Polymeric photoinitiators containing side chain benzophenone chromophores: Relationships between structure and activity, New Polymeric Materials, vol. 1, 1987, pp. 63-83.

Hyun-Sung Do et al., UV-curing behavior and adhesion performance of polymeric photoinitiators blended with hydrogenated rosin epoxy methacrylate for UV-crosslinkable acrylic pressure sensitive adhesives, European Polymer Journal, vol. 44, 2008, pp. 3871-3882.

Tymish Yu. Ogul'Chansky et al., Peculiarities of Triplet Exciton Jump Mechanism in Unconjugated Polymers with Pendant Benzophenone-Type Groups, Section A: Molecular Crystals and Liquid Crystals, vol. 361, 2001, pp. 25-30.

Luigi Angiolini et al., Copolymeric Systems Bearing Side-Chain Thioxanthone and a-Aminoacetophenone Moieties as Photoinitiators for Ultraviolet-Curable Pigmented Coatings, Journal of Applied Polymer Science, vol. 64, 1997, pp. 2247-2258.

International Search Report dated Feb. 26, 2013 in International (PCT) Application No. PCT/EP2012/076038.

Yang et al., "Highly Efficient Aza-Michael Reactions of Aromatic Amines and N-Heterocycles Catalyzed by a Basic Ionic Liquid under Solvent-Free Conditions", Tetrahedron Letters, vol. 47, pp. 7723-7726, 2006.

M. J. Bhanushali et al., "$Y(NO_3)_3 \cdot 6H_2O$ Catalyzed Aza-Michael Addition of Aromatic/Hetero-Aromatic Amines under Solvent-Free Conditions", Catalysis Communications, vol. 9, pp. 1189-1195, 2008.

International Search Report dated Feb. 26, 2013 in International (PCT) Application No. PCT/EP2012/076044.

Notification of the First Office Action dated Dec. 14, 2016 in corresponding Chinese Application No. 201380078382.3.

Yunxing et al., "Handbook of Ink Technology", Beijing: Printing Industry Publishing House, 1st Edition, pp. 887-888 (2009), with English Translation.

* cited by examiner

POLYMERIC PHOTOINITIATORS

BACKGROUND OF THE INVENTION

The present invention relates to a series of polymeric photoinitiators which may be used in various radiation curable compositions, including varnishes, lacquers, printing inks, coating compositions and the like. The invention also provides for radiation curable compositions which include at least one of the compounds of the present invention as a photoinitiator. Photoinitiators used in inks and varnish formulations need to have a good cure speed, and particularly good surface curing activity, low odour and good solubility. Moreover, as consumers become increasingly wary of extraneous compounds in foodstuffs, in order to comply with current and likely future legislation, the tendency of the compounds to migrate and be extracted should also be low.

At present, benzophenone is widely used as photoinitiator for ultraviolet cured inks and overprint varnishes as it has good surface curing, low yellowing and good solubility. It is also very cheap and widely available. However, benzophenone is also known for its relatively strong odour and its exceptional ability to migrate and be extracted from print into foodstuffs, even through barrier packaging such as board and plastic wrappers. Commonly used benzophenone alternatives for low odour applications include benzophenone-2-methyl ester (Speedcure MBB from Lambson) and acrylated benzophenone (EBECRYL® P38 from ALLNEX), although both of these materials are less efficient than benzophenone. Phenylbenzophenone and diphenoxybenzophenones are particularly efficient, but suffer from poor solubility and, in the case of phenylbenzophenone, increased yellowing, which means that it may be used in printing inks (which contain pigments and so can be formulated to hide the yellowing) but that it cannot be used in varnishes.

It is clear that there is a need for low odour benzophenone derivatives with good reactivity, particularly good surface curing, and a limited tendency to migrate.

It is well known that polymeric benzophenone derivatives and multifunctional benzophenone derivatives will give rise to systems that have low odour and reduced tendency to migrate and be extracted. The disadvantage with many of these systems is that their reduced chromophore equivalent per gram means they have poor cure speed. When used in higher concentration to increase reactivity, they often act as plasticizer which is detrimental e.g. for the mechanical properties of the cured ink.

EP1438282B1 describes multi-functional photo-initiators that are based on the reaction of a 4-carboxyalkoxybenzophenone with a polymeric polyhydric alcohol.

There is a need for further polymeric photoinitiators with a high functionality, good solubility in coating formulations, high reactivity, and which give rise to cured coatings which have extremely low odour, and are likely to have a much lower tendency to migrate and be extracted than most benzophenone alternatives.

We have now discovered a series of polymeric compounds based on 2-(4-phenylbenzoyl)benzoic acid as a starting material which meet these requirements.

SUMMARY OF THE INVENTION

Provided herein are photoinitiator compounds (a) of formula (I):

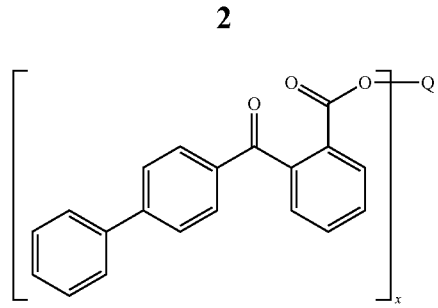

wherein Q is the residue of a hydroxy compound having 1 to 6 hydroxyl groups, and wherein x is a number that is at least 1 but no greater than the number of hydroxyl groups originally present in said hydroxy compound.

If the number of hydroxyl groups is 1 to 6 then x is maximally 6. Generally the hydroxy compound in question is having 1 to 4 hydroxyl groups, preferably 2 to 4 hydroxyl groups. In said case x is maximally 4.

The photoinitiator compounds (a) of the present invention may present one or more of the following advantages:
- they are substantially halogen free (which is often required in food packaging applications),
- they permit a good surface and deep curing,
- they may have low yellowing,
- they may have low odour compared to benzophenone and p-phenyl benzophenone,
- they in general have an excellent photoinitiator reactivity per gram,
- they in general have a reactivity higher than for some other commonly used benzophenone alternatives,
- they in general do not significantly act as plasticizers and as such have little impact on mechanical properties as they can be used in relatively low amounts
- they may have a good solubility with other components of a UV formulation (e.g. with acrylates),
- they permit an easy incorporation into a formulation (because liquid),
- in general less migration issues are expected (due to the hydrophobic nature of the phenyl group grafted to the 2-benzoylbenzoic acid structure).

The photoinitiator compounds (a) of the invention are useful as photoinitiators for use in radiation curable compositions, including varnishes, lacquers, printing inks and coating compositions in general.

Accordingly, the present invention also provides a radiation curable composition (A) comprising
(a) at least one photoinitiator compound of formula (I):

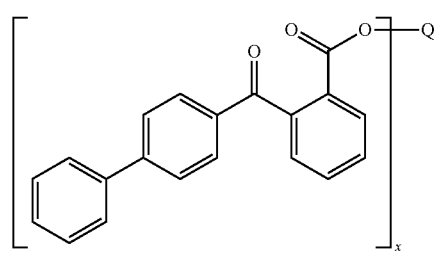

wherein Q is the residue of a hydroxy compound having 1 to 6 (generally 1 to 4, preferably 2 to 4) hydroxyl groups, and wherein x is a number that is at least 1 but no greater than the number of hydroxyl groups originally present in said hydroxy compound;
(b) at least one ethylenically unsaturated compound selected from monomers (b1) and/or from oligomers (b2); and
(c) optionally, at least one co-synergist which preferably is an amino co-synergist.

Radiation curable compositions of the invention may present one or more of the following advantages:
- they can be used in food packaging due to their low migration properties,
- they may have very good flow properties,
- they may have low yellowing,
- they may have weak or no odor,
- they may have good mechanical properties once cured.

The invention still further provides for a process for preparing a cured polymeric composition by exposing a composition of the present invention to radiation, preferably ultraviolet radiation.

DETAILED DESCRIPTION

A first object of the invention relates to photoinitiator compounds (a) of formula (I):

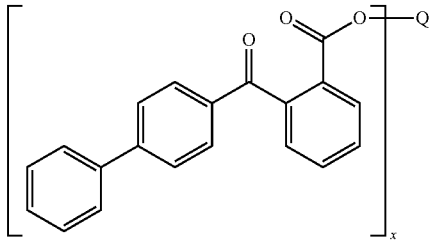

wherein Q is the residue of a hydroxy compound having 1 to 6 (generally 1 to 4, preferably 2 to 4) hydroxyl groups, and
wherein x is a number that is at least 1 but no greater than the number of hydroxyl groups originally present in said hydroxy compound.

The hydroxy compound can be a mono-alcohol or a polyol depending on the case. In a preferred embodiment of the invention, Q is the derivative of a diol and most preferably of a poly(alkylene glycol).

The nature of the material (a) keeps the functionality per gram relatively high and the group Q renders the material highly soluble in coating formulations, especially UV-curable formulations. The final product in many cases has a reactivity higher than some commonly used benzophenone alternatives. The product is also a liquid which is compatible with UV curing formulations and gives rise to inks and overprint varnishes which have extremely low odour, plus they are likely to have a much lower tendency to migrate and be extracted than most benzophenone alternatives.

In an embodiment of the invention, Q is the residue of a hydroxy compound having 1 to 6 hydroxyl groups, wherein the hydroxy compound can be a mono-alcohol or a polyol. Typically the hydroxy compound has 1 to 4, often 2 to 4 hydroxyl groups. The hydroxy compound can be a saturated or an unsaturated hydroxy compound (one bearing one or more ethylenically unsaturated groups). In an embodiment of the invention, the hydroxy compound bears at least one ethylenically unsaturated group. In another embodiment of the invention, the hydroxy compound in question does not bear any such unsaturated groups.

In a first aspect of the invention, Q is the residue of an alkoxylated alcohol (mono-alcohol or polyol) as defined above. Preferably herein, Q is the residue of an alkoxylated polyol which often is an oxyethylated and/or oxypropylated polyol. Suitable examples include for instance ethoxylated pentaerythritol (see e.g. formula II), propoxylated pentaerythritol, ethoxylated and propoxylated pentaerythritol, ethoxylated trimethylolpropane, propoxylated trimethylolpropane, and ethoxylated and propoxylated trimethylolpropane.

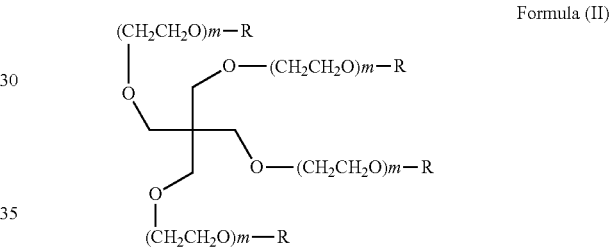

Formula (II)

with m being an integer from 1 to 10.

In a second aspect of the invention, Q is the residue of a polyether, more in particular of a poly(alkylene glycol) like polyethylene glycol, polypropylene glycol or poly tetrahydrofurane. We prefer herein that Q has a number average molecular weight (Mn) no greater than 2000, preferably no greater than 1000, still more preferably no greater than 500 Daltons. Typically the molecular weight is at least 100, preferably at least 150 Daltons.

A preferred polymeric photoinitiator (a) is a compound based on a polyethyleneglycol of formula (III):

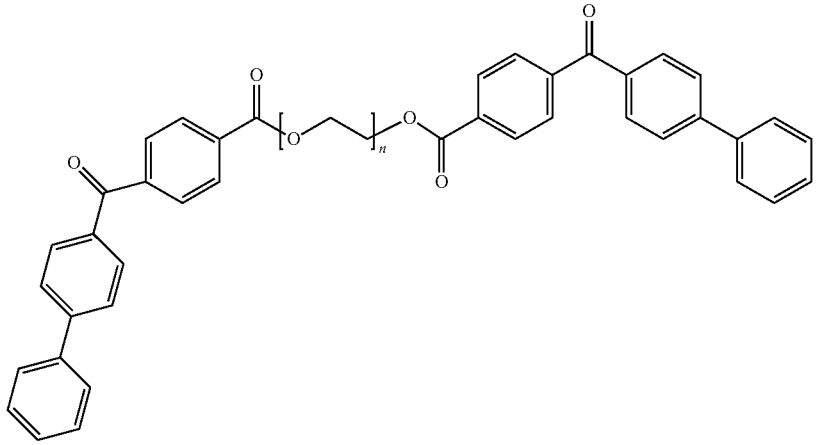

with n being an integer from 1 to 10. Such compound may for instance be prepared from PEG 200 (Mn of 200 Daltons).

Another preferred polymeric photoinitiator (a) is a compound based on a polypropyleneglycol of formula (IV):

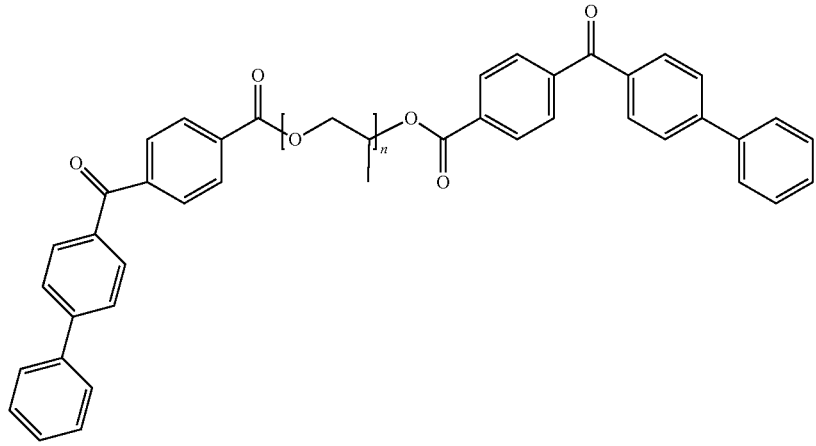

with n being an integer from 1 to 10. Such compound may for instance be prepared from PPG 420 (Mn of 420 Daltons).

Yet another preferred polymeric photoinitiator (a) is a compound based on polytetrahydrofurane of formula (V):

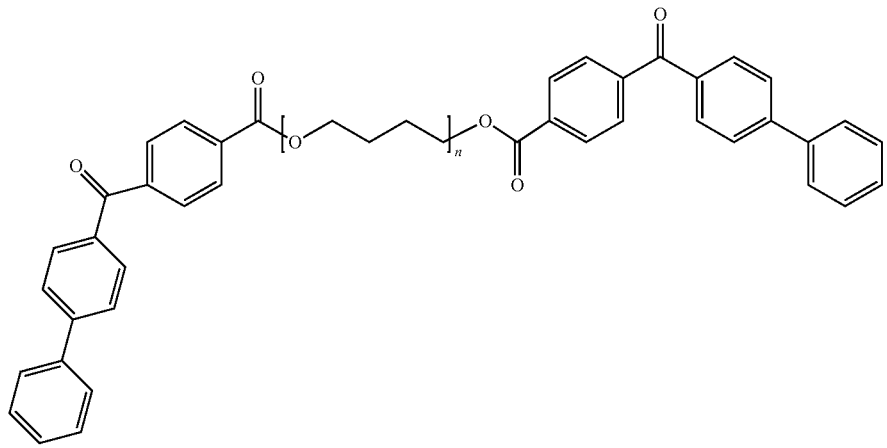

with n being an integer from 1 to 10. Such compound may for instance be prepared from polyTHF 250 (Mn of 250 daltons).

Preferred poly(alkylene glycols) are polyethylene glycols and polypropylene glycols. Most preferred is polyethylene glycol.

The lower hydrophilicity of the p-phenyl group of 2-(4-phenylbenzoyl)benzoic acid allows to use polyethylene glycol backbones that can play the role of a H-donor without the negative impact of such polyethylene glycol moieties on extractibles.

The compounds of the present invention may be prepared by reactions well known for the preparation of compounds of this type, the exact reaction route chosen depending upon the nature of the compound which it is desired to prepare.

As mentioned above, photoinitiator compounds (a) of the invention may be prepared by reacting a 2-(4-phenylbenzoyl)benzoic acid with one or more hydroxy compounds having 1 to 6 hydroxyl groups (in an esterification reaction).

Alternatively, photoinitiator compounds (a) of the invention may be prepared by reacting an alkyl ester of 2-(4-phenylbenzoyl)benzoic acid with one or more hydroxy compounds having 1 to 6 hydroxyl groups (in a transesterification reaction). For the preferred compounds and the usual number of hydroxyl groups, see above. Below preferred reaction conditions are given.

The esterification reaction is normally and preferably effected in the presence of a solvent, the nature of which is not critical to the present invention, provided that it has no adverse effect on the reagents or on the reaction. Examples of suitable solvents include: aromatic hydrocarbons, such as benzene, toluene or xylene.

The esterification reaction is preferably effected in the presence of an acidic catalyst, for example: a sulphonic acid, such as p-toluenesulphonic acid or methanesulphonic acid; a mineral acid, such as sulphuric, hydrochloric or phosphoric acid; or a Lewis acid, such as aluminium chloride, boron trifluoride or an organotitanate.

The temperature at which the esterification reaction is carried out is likewise not critical to the present invention and may vary widely, depending on the reaction conditions and the nature of the reagents and solvent, provided that it is sufficiently high that the water formed in the course of the reaction is removed, in order to drive the reaction to completion. We therefore generally find it convenient to carry out the reaction at about the reflux temperature of the reaction mixture. The time required for the reaction may also vary widely, depending mainly on the reaction temperature.

However, under the preferred conditions outlined above, a period of from 1 to 20 hours will normally suffice.

When the esterification reaction is complete, the desired product may be removed from the reaction mixture by conventional means, for example by washing the reaction mixture, e. g. with water and/or and aqueous alkali, drying and then removing the solvent by evaporation under reduced pressure.

Although the compounds of the present invention are especially useful as photoinitiators for use in the production of varnishes, they may also be used with advantage in many other kinds of radiation curable compositions. For example, although yellowing is not such a problem with printing inks, it may still be advantageous to have a photoinitiator which does not result in yellowing on cure or on ageing, since this gives the ink formulator a much greater degree of freedom in choosing the other ingredients of the ink, including the pigment.

When x is a number less than the number of available hydroxyl groups in the hydroxy compound of which Q is the residue, it will be appreciated that the compounds of the present invention may have free hydroxyl groups. If desired, or if preparation of the compounds is effected in the presence of an acid, these hydroxyl groups may be esterified. There is no particular restriction on the nature of the esters so prepared, although simple, e. g. lower fatty acid, esters are preferred, such as the C2-C6 alkanoyl esters. Examples of such esters include the acetate, propionate, butyrate and valerate esters.

Compound (a) of the invention in particular are useful as photoinitiators for use in radiation curable compositions, including varnishes, lacquers, printing inks and coating compositions.

A second aspect of the invention hence relates to a radiation curable composition (A) comprising (a) at least one photoinitiator compound of formula (I):

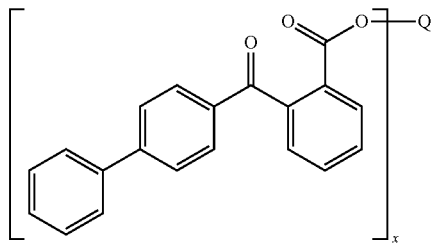

wherein Q is the residue of a hydroxy compound having 1 to 6 (generally 1 to 4, preferably 2 to 4) hydroxyl groups, and wherein x is a number that is at least 1 but no greater than the number of hydroxyl groups originally present in said hydroxy compound;

(b) at least one ethylenically unsaturated compound selected from monomers (b1) and/or from oligomers (b2); and (c) optionally, at least one co-synergist which preferably is an amino co-synergist.

Compounds (a) can herein be any of the above described compounds. Possibly mixtures of different compounds (a) of the invention are used. Compounds (a) typically are present in an amount from 1 to 20% by weight, relative to the total weight of the composition. Usually the amount of compounds (a) in the composition is at least 1% by weight. Preferably the amount of compounds (a) in the composition is at least 3% by weight, more preferably at least 5% by weight. Preferably the amount of compounds (a) in the composition is at most 15% by weight, more preferably at most 12% by weight. Herein, weight percentages (unless specified otherwise) are relative to the total weight of the composition.

Compounds (b) of the invention are ethylenically unsaturated compounds that are typically selected from ethylenically unsaturated monomers (b1) and/or from ethylenically unsaturated oligomers (b2). By "ethylenically unsaturated groups" is meant to designate in the present invention groups with one or more carbon-carbon double bonds which under the influence of irradiation and/or a (photo)initiator can undergo radical polymerization. The polymerizable ethylenically unsaturated groups are generally chosen from (meth)acrylic groups. In the present invention, the term "(meth)acryl" is to be understood as to encompass both acryl and methacryl compounds or derivatives as well as mixtures thereof. Acrylic groups are generally preferred. Preferred are hence (meth)acrylated compounds (b) and most preferred are acrylated compounds.

Suitable compounds (b1) are the typical diluting monomers well known in the art. Compounds (b1) often have a molecular weight MW of at most 1000 Daltons, often at most 700 Daltons. Examples of suitable (meth)acrylate monomers (b1) include hexanediol di(meth)acrylate, trimethylolpropane tri(meth)acrylate, di-trimethylolpropane tetra(meth)acrylate, di-pentaerythritol penta(meth)acrylate, polyether (meth)acrylates, and their oxyethylated and/or oxypropylated derivatives like e.g. ethoxylated trimethylol propane tri(meth)acrylate, ethoxylated/propoxylated trimethylol propane tri(meth)acrylate, glycerol propoxylate tri (meth)acrylate, ethoxylated pentaerythritol tetra(meth)acrylate, ethoxylated/propoxylated pentaerythritol tetra(meth)acrylate. One can also use epoxy (meth)acrylates such as dianol di(meth)acrylate (=the di(meth)acrylate of 2, 2-bis [4-(2-hydroxyethoxy) phenyl] propane, EBECRYL® 150 from ALLNEX) and glycol di(meth)acrylates such as tripropylene glycol di(meth)acrylate.

Examples of suitable (meth)acrylate oligomers (b2) include aliphatic or aromatic urethane (meth)acrylates, polyether (meth)acrylates, polyester (meth)acrylates and/or epoxy (meth)acrylates (such as bisphenol A epoxy acrylate). Also these compounds are well known in the art. Preferred are polyester (meth)acrylates and/or epoxy(meth)acrylates. Again acrylates are preferred.

Compounds (b2) typically have a weight average molecular weight (Mw) of at least 1000, preferably at least 1100 Daltons.

Optionally, compounds (b1) and/or (b2) can contain tertiary amine groups. Examples of suitable amine-modified resins (b2') include the reaction of the resin (b2) with diethylamine, diethanolamine, monoethanolamine, dipropylamine, octylamine, dibutylamine and the like.

Preferably the amount of compounds (b) in the composition is at least 80% by weight, more preferably at least 85% by weight. Preferably the amount of compounds (b) in the composition is at most 99% by weight, preferably at most 97% by weight, more preferably at most 95% by weight.

Preferably the amount of compounds (b1), where present in a composition of the invention is at least 20% by weight, more preferably at least 30% by weight. Preferably the amount of compounds (b1) in the composition is at most 99% by weight, preferably at most 97% by weight more preferably at most 95% by weight.

The amount of compounds (b2) in a composition of the invention typically is from 0 to 80% by weight. Preferably the amount of compounds (b2), where present in a composition of the invention is at least 0.1% by weight, more preferably at least 20% by weight. Preferably the amount of compounds (b2) in the composition is at most 80% by weight, more preferably at most 65% by weight.

Preferably compositions of the invention comprise at least one compound (b1) and at least one compound (b2).

The compositions of the present invention optionally can contain a co-synergist as a further compound (c). By "further" is meant that that said compound is different from compounds (a) and (b). In particular it is different from compounds (b2) that optionally can contain tertiary amine groups. Typically compounds (c) are amine co-synergists.

By an "amine co-synergist" is meant to designate an amine capable of acting as an electron or hydrogen donor with a type II photoinitiator (also called a Norrish type II photoinitiator) like the one compounds (a) of the invention. Type II photoinitiator systems can form an excited state upon irradiation, and then abstract an atom or electron from a donor molecule (the co-synergist). The donor molecule then acts as the initiating species for polymerization. Amine co-synergists most typically bear tertiary amine groups.

Examples of suitable co-synergists (c) include the usual aminoacrylates (e.g. EBECRYL® LEO 10551, EBECRYL® LEO 10552 and EBECRYL® LEO 10553 from ALLNEX), but also other co-synergists like certain dimethylaminobenzoic acid esters can be used.

In an embodiment of the invention a polymeric amine synergist (c) is used. By "polymeric" is meant that the number average molecular weight (Mn) of the polymeric tertiary amine is preferably of 400 Dalton or more, more preferably of 500 Dalton or more and most preferably of 600 Dalton or more. Typically the molecular weight of these compounds is at most 5.000 Dalton, more preferably at most 3.000 Dalton and most preferably at most 2.000 Dalton.

An example of suitable polymeric tertiary amines in this category: dialkyl aminobenzoate esters and more in particular dimethylaminobenzoate esters as described e.g. in U.S. Pat. No. 5,905,164. Both monoamines and diamines can be used, possibly a mixture of both.

An example of a suitable diamine compound in this category is polyethyleneglycol bis (p-dimethyl aminobenzoate) as disclosed in U.S. Pat. No. 5,905,164.

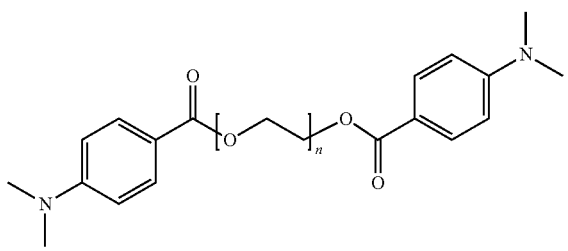

These compounds typically exist in a mixture as described in U.S. Pat. No. 5,905,164 p10, with n typically in the range of from 2 to 110, more preferably from 4 to 61, most preferably from 7 to 40. Another example of a suitable diamine compound in this category is polytetrahydrofurane bis (p-dimethyl aminobenzoate)

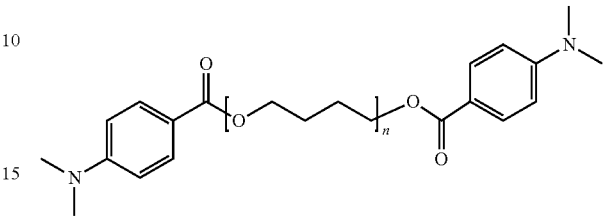

with n typically in the range of from 2 to 65, more preferably from 3 to 40, most preferably from 4 to 25.

An example of a suitable monoamine compound in this category is 4-N,N'-dimethylaminobenzoyl polyethyleneglycol monomethylether as disclosed in U.S. Pat. No. 5,905,164

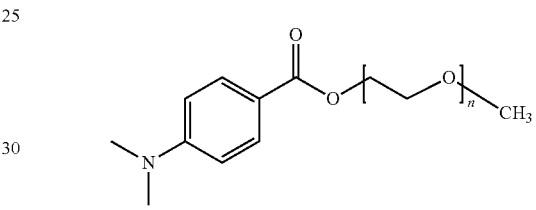

with n typically in the range of from 2 to 110, more preferably from 4 to 61, most preferably from 7 to 40.

Particularly preferred compounds in this category are Omnipol ASA from IGM (a Poly(ethyleneglycol) bis(p-dimethylamino benzoate) with number average molecular weight 488-532 g/mol), ESACURETM A198 from Lamberti & Speedcure 7040 from Lambson (polymeric (mix 4+2) amine with number average molecular weight 1060 g/mol).

Preferably the amount of compounds (c) in the composition, if present, is at least 1% by weight, more preferably at least 3% by weight. Preferably the amount of compounds (c) in the composition is at most 25% by weight, preferably at most 20% by weight, more preferably at most 15% by weight.

The co-synergist (c), more in particular the amine co-synergist (c) may be added in an amount such that the nitrogen content of the varnish (typically an overprint varnish) formulation or of the ink formulation is 0.1% by weight or more, preferably 0.2% by weight or more and most preferably 0.3% by weight or more. Preferably compounds (c) are added in an amount such that the nitrogen content is 10% by weight or less, preferably 5% by weight or less and most preferably 3% by weight or less.

Compositions of the invention may typically further comprise the usual further ingredients and additives such as flow and leveling agents, stabilizer, dispersants, fillers, colorants such as pigments, waxes, photo-initiators different from compounds (a) and/or solvents.

Compositions of the invention can be used for the making of varnishes, lacquers, printing inks and coating compositions. Another embodiment hence relates to varnishes, lacquers, printing inks and coating compositions prepared from a composition (A) of the invention.

Compositions of the invention are in particular suitable for use in

Overprint Varnishes (OPVs),
Flexographic Inks for consumer product packaging: food, pharmaceuticals, tobacco, cosmetics, children's toys,
Lithographic Inks for consumer product packaging: food, pharmaceuticals, tobacco, cosmetics, children's toys,
Xi-Free Coatings for Automotive Interior Applications: Lighting, Dashboard, top-coat,
UV Digital inkjet for contact sensitive applications,
Coatings and OPVs for adult, children and pet toys and packaging,
Coatings and OPVs for writing instruments and arts & craft implements and packaging,
3D Stereo lithographic printing,
Coatings for medial and diagnostic electronic equipment,
Cast and cured 3 dimensional objects,
Coatings for consumer electronic devices: screens, bodies,
Coatings for Marine applications: boat equipment, textiles, decking, panels . . . etc.,
Coatings for wood and composite cabinetry, flooring and furniture,
Coatings for non-woven personal care and temporary wear products and articles,
Woven industrial textiles for conveying, strapping, lifting etc.,
Coatings for filtration media that might come into indirect contact with food, pharma, tobacco products Yet a further aspect of the invention relates to a varnish, lacquer, printing inks or general coating composition comprising a composition (A) of the invention or a photoinitiator (a) of the invention.

Yet another aspect of the invention relates to an article that is coated or printed with a coating composition of the invention.

Still a further aspect of the invention relates to a process for preparing a cured polymeric composition by exposing a composition according to the invention to radiation.

Yet a further aspect of the invention relates to an article printed or coated, entirely or in part, with a composition according the invention.

The present invention will be further illustrated by reference to the following non-limiting examples.

PREPARATION EXAMPLES 1 and 1R

In a reactor equipped with a Dean stark, 200 g of poly(ethylene glycol) (PEG200 with a Mn of 200), 600 g of 2-(4-phenylbenzoyl)benzoic acid (Ex1) or 521 g of 2-(4-chlorobenzoyl)benzoic acid (Ex1 R), 67 g of paratoluenesulfonic acid were refluxed in 660 ml of toluene until all water had been removed by azeotropic distillation.

The organic phase was washed with 180 ml of an aqueous solution of sodium sulphate (16 wt %) to remove the acid catalyst. The residual water in the organic phase was distilled off and the remaining salt removed by filtration. After removal of toluene by distillation and stripping, a brownish high viscous liquid was obtained.

Tendency to be Extracted in Food 75 parts of a photoinitiator (a) according to the invention (Ex1) were diluted in 25 parts of EBECRYL® LEO 10501 (polyesteracrylate). Five (5) wt % of this solution was added to a mixture ethanol/water (95/5) and stirred at room temperature for 2 hours. It remained a hazy suspension that which decanted after stopping the agitation. This demonstrates the low solubility of the photoinitiator (a), and therefore its low tendency to be extracted in food simulants (like mixture ethanol/water 95/5) currently approved in Europe.

Similarly, 75 parts of the photoinitiator of Comparative Example 1 (Ex1 R) were diluted in 25 parts of EBECRYL® LEO 10501 and treated in a similar way. It was a very slightly hazy (nearly transparent) and homogeneous solution. This demonstrates the good solubility of this photoinitiator and therefore its high tendency to be extracted in food simulants.

PREPARATION EXAMPLES 2 to 3

Similar photoinitiator compounds (a) were prepared using other types of poly(alkylene glycols) like a polypropylene glycol or a polytetrahydrofurane. They were synthesized as described above with exception of the amounts and types of compounds as listed in Table 1.

TABLE 1

|  | Ex1 | Ex1R | Ex 2 | Ex 3 |
| --- | --- | --- | --- | --- |
| Polyethyleneglycol (Mn 200) | 200 g | 200 g |  |  |
| Polypropyleneglycol (Mn 420) |  |  | 200 g |  |
| Polytetrahydrofurane (Mn 250) |  |  |  | 200 g |
| 2-(4-phenyl-benzoyl)benzoic acid | 600 g |  | 284 g | 483 g |
| 2-(4-chlorol benzoyl)benzoic acid |  | 521 g |  |  |
| Paratoluenesulfonic acid | 67 g | 67 g | 40 g | 60 g |
| Toluene | 660 ml | 660 ml | 400 ml | 620 ml |
| Sodium sulphate (16 wt %) | 180 ml | 180 ml | 110 ml | 160 ml |

Evaluation in an Overprint Varnish

Overprint varnishes formulations were prepared based on the formulations described in Table 2. Cured films (4 pm layers) were prepared using a bar coater and cured by UV (120 W/cm).

UV reactivity was assessed by the "graphite test" (the higher the number, the higher the surface reactivity) and by an "acetone double rubs test" (the higher the number, the higher the deep curing reactivity).

Graphite test: This test is performed by placing some graphite on the coated surface, followed by rubbing said surface with a piece of cotton. If no black stain remain on the surface, the surface is considered cured. "10 m/min" means that curing at 10 m/min was necessary to pass the graphite test. This was assessed in air atmosphere.

Acetone double rubs test: The rubs are made with a piece of cotton rag saturated with acetone; one double rub is equal to a forward and backward stroke on the coated surface. The reported number is the number of double rubs required to break through the coating. "60" means that 60 doubles rubs are necessary to break through the coating. This was assessed in air atmosphere The results obtained are presented in Table 2 below.

TABLE 2

|  | FEx1R (Comparative) Weight % | FEx1 Weight % |
| --- | --- | --- |
| Amino acrylate based on an aminated polyester acrylate | 50 | 50 |

TABLE 2-continued

|  | FEx1R (Comparative) Weight % | FEx1 Weight % |
|---|---|---|
| Tetra functional polyester acrylate | 22 | 25 |
| EBECRYL ® 570 | 15 | 12 |
| 75 parts of polymeric the photoinitiator of EX1R diluted in 25 parts of EBECRYL ® LEO 10501 | 13 |  |
| 75 parts of polymeric photoinitiator of Ex1 diluted in 25 parts of EBECRYL ® LEO 10501 |  | 13 |
| Nitrogen wt % | 0.5 | 0.5 |
| Viscosity at 25° C. (mPas) | 490 | 470 |
| Graphite test (m/min) | 10 | 20 |
| 1 × 60 m/min Acetone double rubs | 0 | 2 |
| 2 × 60 m/min Acetone double rubs | 4 | 19 |
| 3 × 60 m/min Acetone double rubs | 13 | 30 |
| 4 × 60 m/min Acetone double rubs | 16 | 50 |
| 5 × 60 m/min Acetone double rubs | 19 | 68 |

EBECRYL ® 570 is a carboxyl functionalized polyester (b2) diluted in tetra functional polyester acrylate (b1)

The above shows that formulations that are based on a polymeric photoinitiator (a) of the invention exhibit significantly better surface cure (graphite test) and deep cure (assessed by acetone double rubs test) than formulations based on a polymeric photoinitiator of comparative Example 1 (ex 1R).

The invention claimed is:

1. A radiation curable composition (A) comprising,
(a) at least one photoinitiator compound of formula (I):

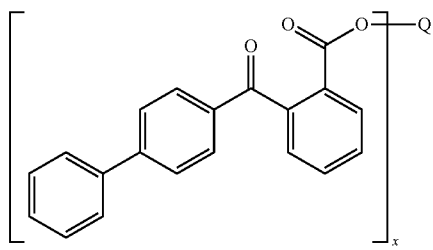

wherein Q is the residue of a hydroxy compound having 1 to 6 hydroxyl groups,
wherein x is a number that is at least 1 but no greater than the number of hydroxyl groups originally present in said hydroxy compound, and
wherein the hydroxy compound is a saturated hydroxy compound having 1 to 6 hydroxyl groups and is selected from the group consisting of an alkoxylated alcohol and a polyether; and
(b) at least one ethylenically unsaturated compound selected from the group consisting of monomers (b1) and oligomers (b2).

2. The composition of claim 1, comprising at least one photoinitiator compound of formula (I) wherein the alkoxylated alcohol is an alkoxylated polyol.

3. The composition of claim 2, wherein the alkoxylated polyol is an oxyethylated and/or oxypropylated polyol.

4. The composition of claim 1, comprising at least one photoinitiator compound of formula (I) wherein the polyether is a poly(alkylene glycol).

5. The composition of claim 4, wherein the poly(alkylene glycol) is selected from the group consisting of polyethylene glycol, polypropylene glycol and polytetrahydrofurane.

6. The composition of claim 1, wherein the amount of compounds (a) in said composition is from 1 to 20% by weight.

7. The composition of to claim 1, wherein compounds (b) are (meth)acrylated compounds.

8. The composition of claim 1, wherein the amount of compounds (b2) in said composition is at most 80% by weight.

9. The composition of claim 1, further comprising from 0 to 25% by weight of at least one co-synergist (c).

10. The composition of claim 9, wherein the co-synergist is an amine co-synergist.

11. A photoinitiator compound (a) of formula (I):

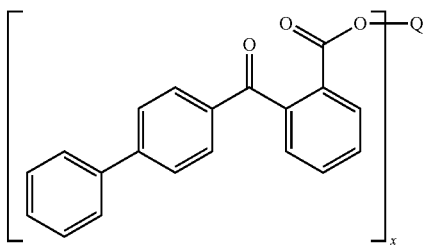

wherein Q is the residue of a hydroxy compound having 1 to 6 hydroxyl groups,
wherein x is a number that is at least 1 but no greater than the number of hydroxyl groups originally present in said hydroxy compound, and
wherein the hydroxy compound is a saturated hydroxy compound having 1 to 6 hydroxyl groups and is selected from the group consisting of an alkoxylated alcohol and a polyether.

12. The photoinitiator compound (a) of claim 11, wherein the polyether is a poly(alkylene glycol).

13. A varnish, lacquer, ink or coating composition comprising the composition (A) according to claim 1.

14. A process for preparing a cured polymeric composition by exposing the composition according to claim 1 to radiation.

15. An article printed or coated, entirely or in part, with the composition according to claim 1.

16. A varnish, lacquer, ink or coating composition comprising the photoinitiator compound (a) according to claim 11.

17. The composition according to claim 7, wherein the (meth)acrylated compounds are acrylated compounds.

18. The composition according to claim 1, wherein the composition comprises at least one compound (b 1) and at least one compound (b2).

19. The composition according to claim 1, wherein x is 2.

* * * * *